United States Patent [19]

Van Dijk et al.

[11] Patent Number: 5,663,136
[45] Date of Patent: Sep. 2, 1997

[54] PROCESS FOR MAKING COMPACT DETERGENT COMPOSITIONS

[75] Inventors: Paul Van Dijk, Putte; Jose Luis Vega, Strombeek-Bever, both of Belgium; Haydn Guy William Dickenson, Newcastle Upon Tyne, United Kingdom

[73] Assignee: The Procter & Gamble Company, Cincinnati, Ohio

[21] Appl. No.: 356,190

[22] PCT Filed: Jun. 2, 1993

[86] PCT No.: PCT/US93/05300

§ 371 Date: Jan. 30, 1995

§ 102(e) Date: Jan. 30, 1995

[87] PCT Pub. No.: WO93/25378

PCT Pub. Date: Dec. 23, 1993

[30] Foreign Application Priority Data

Jun. 15, 1992 [EP] European Pat. Off. ............ 92870089

[51] Int. Cl.$^6$ .................................................... C11D 11/00
[52] U.S. Cl. ................... 510/444; 510/108; 510/345; 510/467; 510/495; 510/507; 510/509; 510/511; 510/512
[58] Field of Search .................. 510/444, 443, 510/507, 108, 511, 512, 495, 467, 345, 509

[56] References Cited

U.S. PATENT DOCUMENTS

| | | | |
|---|---|---|---|
| 4,075,116 | 2/1978 | Mesaros | 252/102 |
| 4,378,300 | 3/1983 | Gray | 252/99 |
| 4,704,233 | 11/1987 | Hartman et al. | 252/527 |
| 4,737,306 | 4/1988 | Wichelhaus et al. | 252/95 |
| 4,925,585 | 5/1990 | Strauss et al. | 252/89.1 |
| 5,066,415 | 11/1991 | Dany et al. | 252/135 |
| 5,133,924 | 7/1992 | Appel et al. | 264/342 R |
| 5,160,657 | 11/1992 | Bortolotti et al. | 252/174.14 |
| 5,164,108 | 11/1992 | Appel et al. | 252/174 |
| 5,366,652 | 11/1994 | Capeci et al. | 252/89.1 |
| 5,397,507 | 3/1995 | Bauer et al. | 252/549 |

FOREIGN PATENT DOCUMENTS

| | | | |
|---|---|---|---|
| 43932/89 | 5/1990 | Australia | C11D 11/00 |
| 52286/90 | 10/1990 | Australia | B01J 2/10 |
| 63159/90 | 3/1991 | Australia | C11D 11/00 |
| 0342043 | 11/1989 | European Pat. Off. | |
| 0 367 339 | 5/1990 | European Pat. Off. | C11D 11/00 |
| 0 510 746 A3 | 10/1992 | European Pat. Off. | C11D 11/00 |
| 2 166 452 | 5/1986 | United Kingdom | C11D 11/00 |

*Primary Examiner*—Paul Lieberman
*Assistant Examiner*—Lorna M. Douyon
*Attorney, Agent, or Firm*—Ken K. Patel; Jacobus C. Rasser; Jerry J. Yetter

[57] ABSTRACT

A process for the continuous preparation of a granular detergent composition or component having a bulk density greater than 650 g/l which comprises the steps of: i) dispersing a detergent active paste throughout a powder stream in a high speed mixer with a residence time of from 2 seconds to 30 seconds, ii) forming an agglomerate in a moderate speed mixer/agglomerator with a residence time of less than 2 minutes, in which, optionally, a finely divided powder may be added, iii) drying and/or cooling. Granular detergent compositions which are made by this process, and which have excellent solubility properties especially with respect to dispensing and rate of dissolution are also described.

11 Claims, No Drawings

PROCESS FOR MAKING COMPACT DETERGENT COMPOSITIONS

BACKGROUND OF THE INVENTION

There is a trend amongst commercially available granular detergents towards higher bulk densities and towards granular detergent components which have a higher content of detergent active ingredients.

Many of the prior art attempts to move in this direction have met with problems of poor solubility properties arising from low rate of dissolution or the formation of gels. A consequence of this in a typical washing process can be poor dispensing of the product, either from the dispensing drawer of a washing machine, or from a dosing device placed with the laundry inside the machine. This poor dispensing is often caused by gelling of particles which have high levels of surfactant upon contact with water. The gel prevents a proportion of the detergent powder from being solubilised in the wash water which reduces the effectiveness of the powder. Another adverse consequence arises even if the powder is well dispensed and dispersed in the washing water if it does not dissolve rapidly. The wash cycle has a limited duration during which the detergent can act upon the laundry. If the cleaning action is delayed because the powder is slow to dissolve, this, too, will limit the effectiveness of the powder.

The process engineer and formulator have frequently found that the need for good dispensing and the need for good dissolution rate have placed conflicting demands upon them. The solution has generally been to find a compromise which gives adequate dispensing and adequate dissolution rate. For example, poor dispensing of high bulk density granular detergents is often associated with surfactant rich particles having a high specific surface area, either due to high porosity or a small particle size (especially "fines"). However, decreasing the porosity and/or increasing the average particle size cause the dissolution rate to decrease.

Prior art has dealt with the problems of processing granules in a number of different ways which are intended to optimise the physical properties of the resulting powders.

One processing route is described in GB 2 166 452, published on May 8th, 1986. This patent proposes a process for making a detergent composition with a high bulk density and good solubility properties. This process is based on agglomeration in a kneader forming pellets, followed by granulation to the required particle size distribution in, for example, a hammer mill.

Other processes in the prior art have sought to avoid the step of granulating pellets which is capital-intensive and expensive. One such process is a high speed mixer into which a liquid binder is sprayed, coupled with a lower speed mixer/agglomerator to form the final physical properties of the granules, including particle size and shape. It is apparent from the prior art that choice of starting materials, choice of liquid binder, and choice of processing parameters can give a wide range of finished products.

U.S. Pat. No. 4,846,409, published on Jul. 11th, 1989, proposes a process of granulating a powder in succession in a high speed mixer and a low speed mixing granulator, followed by drying in a fluidised bed into which a binder is sprayed. The process is said to be particularly suitable for dyestuff granules. Water is the preferred granulating liquid.

EPA 367 339, published on May 9th, 1990, also proposes a sequence of processing steps comprising a high speed mixer/densifier, a moderate speed granulator/densifier and a drying or cooling step. The process is aimed primarily at densification of porous spray-dried particles by deforming them in order to produce a finished particle with a porosity of less than 10%, and preferably less than 5%.

WO 92/04398, published on 19th Mar., 1992, describes a process for making agglomerates by extrusion followed by granulation. The resulting surfactant rich particles have a low porosity and contain very few or no fines. This results in good dispensing properties, but slower dissolution rate.

European application 92200993.1 assigned to the Applicants describes a granulation process which uses a high active surfactant paste as the binder. This application is a part of the state of the art in accordance with Article 54 (3) EPC.

The present invention provides a continuous process for making a high bulk density granular composition with improved solubility properties, in particular, a composition which has both good dispensing and good dissolution rate. The process for making this composition can produce surfactant rich particles with a porosity which is favourable for a good rate of dissolution (about 10% or higher), but which is still well below the porosity of spray dried powder (up to 70%) which have a much lower bulk density. The process of the invention also produces surfactant rich particles with a narrow particle size distribution which contains few "fines" and which favours good dispensing.

This is achieved by the choice of starting materials, especially choice of the pre-neutralised surfactant paste which acts as the liquid binder, which are essentially different from the starting materials described in the prior art. Furthermore, this process is characterised by a short residence times in the mixing and granulating units when the process is operated according to the present invention.

SUMMARY OF THE INVENTION

A process for the continuous preparation of a granular detergent composition or component having a bulk density greater than 650 g/l which comprises the steps of:
i) dispersing a detergent active paste throughout a powder stream in a high speed mixer with a residence time of from 2 seconds to 30 seconds,
ii) forming an agglomerate in a moderate speed mixer/agglomerator with a residence time of less than 2 minutes, in which, optionally, a finely divided powder may be added,
iii) drying and/or cooling.

DETAILED DESCRIPTION OF THE INVENTION

The present invention provides a process for making a high active, high bulk density granular composition or component which has excellent properties of solubility. This has been achieved by rapidly dispersing a surfactant paste, evenly throughout a powder stream which comprises a builder or builders, such that few or no lumps are formed in areas of high concentration of surfactant. Preferably, the surfactant is in the form of a high active paste comprising one or more neutralised salts of anionic surfactants. A subsequent stage of the process is a granulation stage which is short in order to avoid reducing the porosity of the particles below 10%, preferably not below 15%. In order to achieve this the granulation stage of the process has a residence time of less than 2 minutes, preferably less than 1 minute, and more preferably less than 45 seconds. Optionally, a finely divided powder is added to the granulation stage to "dust" the powder, thereby improving flow properties and increasing bulk density.

The Pastes

One or various aqueous pastes of the salts of anionic surfactants is preferred for use in the present invention, preferably the sodium salt of the anionic surfactant. In a preferred embodiment, the anionic surfactant is preferably as concentrated as possible, (that is, with the lowest possible moisture content possible that allows it to flow in the manner of a liquid) so that it can be pumped at temperatures at which it remains stable. While granulation using various pure or mixed surfactants is known, for the present invention to be of practical use in industry and to result in particles of adequate physical properties to be incorporated into granular detergents, an anionic surfactant must be part of the paste in a concentration of above 10%, preferably from 10–95%, more preferably from 20–95%, and most preferably from 40%–95%.

It is preferred that the moisture in the surfactant aqueous paste is as low as possible, while maintaining paste fluidity, since low moisture leads to a higher concentration of the surfactant in the finished particle. Preferably the paste contains between 5 and 40% water, more preferably between 5 and 30% water and most preferably between 5 and 20% water. A highly attractive mode of operation for lowering the moisture of the paste prior to entering the agglomerator without problems with very high viscosities is the installation, in line, of an atmospheric or a vacuum flash drier or extruder whose outlet is connected to the agglomerator.

It is preferable to use high active surfactant pastes to minimize the total water level in the system during mixing, granulating and drying. Lower water levels allow for: (1) a higher active surfactant to builder ratio, e.g., 1:1; (2) higher levels of other liquids in the formula without causing dough or granular stickiness; (3) less cooling, due to higher allowable granulation temperatures; and (4) less granular drying to meet final moisture limits.

Two important parameters of the surfactant pastes which can affect the mixing and granulation step are the paste temperature and viscosity. Viscosity is a function, among others, of concentration and temperature, with a range in this application from about 5,000 cps to 10,000,000 cps. Preferably, the viscosity of the paste entering the system is from about 20,000 to about 100,000 cps. and more preferably from about 30,000 to about 70,000 cps. The viscosity of the paste of this invention is measured at a temperature of 70° C. and at a shear rate of 25 sec$^{-1}$.

The paste can be introduced into the mixer at an initial temperature between its softening point (generally in the range of 40°–60° C.) and its degradation point (depending on the chemical nature of the paste, e.g. alkyl sulphate pastes tend to degrade above 75°–85° C.). High temperatures reduce viscosity simplifying the pumping of the paste but result in lower active agglomerates. The use of in-line moisture reduction steps (e.g. flash drying), however, require the use of higher temperatures (above 100° C.). In the present invention, the activity of the agglomerates is maintained high due to the elimination of moisture.

The introduction of the paste into the mixer can be done in many ways, from simply pouring to high pressure pumping through small holes at the end of the pipe, before the entrance to the mixer. While all these ways are viable to manufacture agglomerates with good physical properties, it has been found that in a preferred embodiment of the present invention the extrusion of the paste results in a better distribution in the mixer which improves the yield of particles with the desired size. The use of high pumping pressures prior to the entrance in the mixer results in an increased activity in the final agglomerates. By combining both effects, and introducing the paste through holes (extrusion) small enough to allow the desired flow rate but that keep the pumping pressure to a maximum feasible in the system, highly advantageous results are achieved.

High Active Surfactant Paste

The activity of the aqueous surfactant paste is at least 30% and can go up to about 95%; preferred activities are: 50–80% and 65–75%. The balance of the paste is primarily water but can include a processing aid such as a nonionic surfactant. At the higher active concentrations, little or no builder is required for cold granulation of the paste. The resultant concentrated surfactant granules can be added to dry builders or powders or used in conventional agglomeration operations. The aqueous surfactant paste contains an organic surfactant selected from the group consisting of anionic, zwitterionic, ampholytic and cationic surfactants, and mixtures thereof. Anionic surfactants are preferred. Nonionic surfactants are used as secondary surfactants or processing aids and are not included herein as an "active" surfactant. Surfactants useful herein are listed in U.S. Pat. No. 3,664,961, Norris, issued May 23, 1972, and in U.S. Pat. No. 3,919,678, Laughlin et al., issued Dec. 30, 1975. Useful cationic surfactants also include those described in U.S. Pat. No. 4,222,905, Cockrell, issued Sep. 16, 1980, and in U.S. Pat. No. 4,239,659, Murphy, issued Dec. 16, 1980. However, cationic surfactants are generally less compatible with the aluminosilicate materials herein, and thus are preferably used at low levels, if at all, in the present compositions. The following are representative examples of surfactants useful in the present compositions.

Water-soluble salts of the higher fatty acids, i.e., "soaps", are useful anionic surfactants in the compositions herein. This includes alkali metal soaps such as the sodium, potassium, ammonium, and alkylammonium salts of higher fatty acids containing from about 8 to about 24 carbon atoms, and preferably from about 12 to about 18 carbon atoms. Soaps can be made by direct saponification of fats and oils or by the neutralization of free fatty acids. Particularly useful are the sodium and potassium salts of the mixtures of fatty acids derived from coconut oil and tallow, i.e., sodium or potassium tallow and coconut soap.

Useful anionic surfactants also include the water-soluble salts, preferably the alkali metal, ammonium and alkylolammonium salts, of organic sulfuric reaction products having in their molecular structure an alkyl group containing from about 10 to about 20 carbon atoms and a sulfonic acid or sulfuric acid ester group. (Included in the term "alkyl" is the alkyl portion of acyl groups.) Examples of this group of synthetic surfactants are the sodium and potassium alkyl sulfates, especially those obtained by sulfating the higher alcohols ($C_8$–$C_{18}$ carbon atoms) such as those produced by reducing the glycerides of tallow or coconut oil; and the sodium and potassium alkyl benzene sulfonates in which the alkyl group contains from about 9 to about 15 carbon atoms, in straight or branched chain configuration, e.g., those of the type described in U.S. Pat. Nos. 2,220,099 and 2,477,383. Especially valuable are linear straight chain alkyl benzene sulfonates in which the average number of carbon atoms in the alkyl group is from about 11 to 13, abbreviated as $C_{11}$–$C_{13}$ LAS.

Other anionic surfactants herein are the sodium alkyl glyceryl ether sulfonates, especially those ethers of higher alcohols derived from tallow and coconut oil; sodium coconut oil fatty acid monoglyceride sulfonates and sulfates;

sodium or potassium salts of alkyl phenol ethylene oxide ether sulfates containing from about 1 to about 10 units of ethylene oxide per molecule and wherein the alkyl groups contain from about 8 to about 12 carbon atoms; and sodium or potassium salts of alkyl ethylene oxide ether sulfates containing from about 1 to about 10 units of ethylene oxide per molecule and wherein the alkyl group contains from about 10 to about 20 carbon atoms.

Other useful anionic surfactants herein include the water-soluble salts of esters of alpha-sulfonated fatty acids containing from about 6 to 20 carbon atoms in the fatty acid group and from about 1 to 10 carbon atoms in the ester group; water-soluble salts of 2-acyloxy-alkane-1-sulfonic acids containing from about 2 to 9 carbon atoms in the acyl group and from about 9 to about 23 carbon atoms in the alkane moiety; alkyl ether sulfates containing from about 10 to 20 carbon atoms in the alkyl group and from about 1 to 30 moles of ethylene oxide; watersoluble salts of olefin sulfonates containing from about 12 to 24 carbon atoms; and beta-alkyloxy alkane sulfonates containing from about 1 to 3 carbon atoms in the alkyl group and from about 8 to about 20 carbon atoms in the alkane moiety.

The preferred anionic surfactant pastes are mixtures of linear or branched alkylbenzene sulfonates having an alkyl of 10–16 carbon atoms and alkyl sulfates having an alkyl of 10–18 carbon atoms. These pastes are usually produced by reacting a liquid organic material with sulfur trioxide to produce a sulfonic or sulfuric acid and then neutralizing the acid to produce a salt of that acid. The salt is the surfactant paste discussed throughout this document. The sodium salt is preferred due to end performance benefits and cost of NaOH vs. other neutralizing agents, but is not required as other agents such as KOH may be used.

Water-soluble nonionic surfactants are also useful as secondary surfactant in the compositions of the invention. Indeed, preferred processes use anionic/nonionic blends. A particularly preferred paste comprises a blend of nonionic and anionic surfactants having a ratio of from about 0.01:1 to about 1:1, more preferably about 0.05:1. Nonionics can be used up to an equal amount of the primary organic surfactant. Such nonionic materials include compounds produced by the condensation of alkylene oxide groups (hydrophilic in nature) with an organic hydrophobic compound, which may be aliphatic or alkyl aromatic in nature. The length of the polyoxyalkylene group which is condensed with any particular hydrophobic group can be readily adjusted to yield a water-soluble compound having the desired degree of balance between hydrophilic and hydrophobic elements.

Suitable nonionic surfactants include the polyethylene oxide condensates of alkyl phenols, e.g., the condensation products of alkyl phenols having an alkyl group containing from about 6 to 16 carbon atoms, in either a straight chain or branched chain configuration, with from about 4 to 25 moles of ethylene oxide per mole of alkyl phenol. Also suitable are polyhydroxy fatty acid amides, such as those derived from glucose.

Preferred nonionics are the water-soluble condensation products of aliphatic alcohols containing from 8 to 22 carbon atoms, in either straight chain or branched configuration, with from 4 to 25 moles of ethylene oxide per more of alcohol. Particularly preferred are the condensation products of alcohols having an alkyl group containing from about 9 to 15 carbon atoms with from about 4 to 25 moles of ethylene oxide per mole of alcohol; and condensation products of propylene glycol with ethylene oxide.

Semi-polar nonionic surfactants include water-soluble amine oxides containing one alkyl moiety of from about 10 to 18 carbon atoms and 2 moieties selected from the group consisting of alkyl groups and hydroxyalkyl groups containing from 1 to about 3 carbon atoms; water-soluble phosphine oxides containing one alkyl moiety of about 10 to 18 carbon atoms and 2 moieties selected from the group consisting of alkyl groups and hydroxyalkyl groups containing from about 1 to 3 carbon atoms; and water-soluble sulfoxides containing one alkyl moiety of from about 10 to 18 carbon atoms and a moiety selected from the group consisting of alkyl and hydroxyalkyl moieties of from about 1 to 3 carbon atoms.

Ampholytic surfactants include derivatives of aliphatic or aliphatic derivatives of heterocyclic secondary and tertiary amines in which the aliphatic moiety can be either straight or branched chain and wherein one of the aliphatic substituents contains from about 8 to 18 carbon atoms and at least one aliphatic substituent contains an anionic water-solubilizing group.

Zwitterionic surfactants include derivatives of aliphatic quaternary ammonium phosphonium, and sulfonium compounds in which one of the aliphatic substituents contains from about 8 to 18 carbon atoms.

Particularly preferred surfactants herein include linear alkylbenzene sulfonates containing from about 11 to 14 carbon atoms in the alkyl group; tallow alkyl sulfates; coconutalkyl glyceryl ether sulfonates; alkyl ether sulfates wherein the alkyl moiety contains from about 14 to 18 carbon atoms and wherein the average degree of ethoxylation is from about 1 to 4; olefin or paraffin sulfonates containing from about 14 to 16 carbon atoms; alkyldimethylamine oxides wherein the alkyl group contains from about 11 to 16 carbon atoms; alkyldimethylammonio propane sulfonates and alkyldimethylammonio hydroxy propane sulfonates wherein the alkyl group contains from about 14 to 18 carbon atoms; soaps of higher fatty acids containing from about 12 to 18 carbon atoms; condensation products of C9-C15 alcohols with from about 3 to 8 moles of ethylene oxide, and mixtures thereof.

Useful cationic surfactants include water-soluble quaternary ammonium compounds of the form $R_4R_5R_6R_7N^+X^-$, wherein $R_4$ is alkyl having from 10 to 20, preferably from 12–18 carbon atoms, and $R_5$, $R_6$ and $R_7$ are each $C_1$ to $C_7$ alkyl preferably methyl; $X^-$ is an anion, e.g. chloride. Examples of such trimethyl ammonium compounds include $C_{12-14}$ alkyl trimethyl ammonium chloride and cocalkyl trimethyl ammonium methosulfate.

Specific preferred surfactants for use herein include: sodium linear $C_{11}$–$C_{13}$ alkylbenzene sulfonate; α-olefin sulphonates; triethanolammonium $C_{11}$–$C_{13}$ alkylbenzene sulfonate; alkyl sulfates, (tallow, coconut, palm, synthetic origins, e.g. $C_{45}$, etc.); sodium alkyl sulfates; methyl ester sulphonate; sodium coconut alkyl glyceryl ether sulfonate; the sodium salt of a sulfated condensation product of a tallow alcohol with about 4 moles of ethylene oxide; the condensation product of a coconut fatty alcohol with about 6 moles of ethylene oxide; the condensation product of tallow fatty alcohol with about 11 moles of ethylene oxide; the condensation of a fatty alcohol containing from about 14 to about 15 carbon atoms with about 7 moles of ethylene oxide; the condensation product of a $C_{12}$–$C_{13}$ fatty alcohol with about 3 moles of ethylene oxide; 3-(N,N-dimethyl-N-coconutalkylammonio)-2-hydroxypropane-1-sulfonate; 3-(N,N-dimethyl-N-coconutalkylammonio)-propane-1-sulfonate; 6-(N-dodecylbenzyl-N,N-dimethylammonio) hexanoate; dodecyldimethylamine oxide; coconutalkyldimethylamine oxide; and the water-soluble sodium and potassium salts of coconut and tallow fatty acids.

(As used herein, the term "surfactant" means non-nonionic surfactants, unless otherwise specified. The ratio of the surfactant active (excluding the nonionic(s)) to dry detergent builder or powder ranges from 0.005:1 to 19:1, preferably from 0.05:1 to 10:1, and more preferably from 0.1:1 to 5:1. Even more preferred said surfactant active to builder ratios are 0.15:1 to 1:1; and 0.2:1 to 0.5:1).

Builders and Powders

Any compatible builder or combination of builders and/or other powders can be used in the process and compositions of the present invention.

The detergent compositions herein can contain crystalline aluminosilicate ion exchange material of the formula $$Na_z[(AlO_2)_z \cdot (SiO_2)_y] \cdot xH_2O$$

wherein z and y are at least about 6, the molar ratio of z to y is from about 1.0 to about 0.4 and z is from about 10 to about 264. Amorphous hydrated aluminosilicate materials useful herein have the empirical formula $$M_z(zAlO_2 \cdot ySiO_2)$$

wherein M is sodium, potassium, ammonium or substituted ammonium, z is from about 0.5 to about 2 and y is 1, said material having a magnesium ion exchange capacity of at least about 50 milligram equivalents of $CaCO_3$ hardness per gram of anhydrous aluminosilicate. Hydrated sodium Zeolite A with a particle size of from about 1 to 10 microns is preferred.

The aluminosilicate ion exchange builder materials herein are in hydrated form and contain from about 10% to about 28% of water by weight if crystalline, and potentially even higher amounts of water if amorphous. Highly preferred crystalline aluminosilicate ion exchange materials contain from about 18% to about 22% water in their crystal matrix. The crystalline aluminosilicate ion exchange materials are further characterized by a particle size diameter of from about 0.1 micron to about 10 microns. Amorphous materials are often smaller, e.g., down to less than about 0.01 micron. Preferred ion exchange materials have a particle size diameter of from about 0.2 micron to about 4 microns. The term "particle size diameter" herein represents the average particle size diameter by weight of a given ion exchange material as determined by conventional analytical techniques such as, for example, microscopic determination utilizing a scanning electron microscope. The crystalline aluminosilicate ion exchange materials herein are usually further characterized by their calcium ion exchange capacity, which is at least about 200 mg equivalent of $CaCO_3$ water hardness/g of aluminosilicate, calculated on an anhydrous basis, and which generally is in the range of from about 300 mg eq./g to about 352 mg eq./g. The aluminosilicate ion exchange materials herein are still further characterized by their calcium ion exchange rate which is at least about 2 grains $Ca^{++}$/gallon/minute/gram/gallon of aluminosilicate (anhydrous basis), and generally lies within the range of from about 2 grains/gallon/minute/gram/gallon to about 6 grains/gallon/minute/gram/gallon, based on calcium ion hardness. Optimum aluminosilicate for builder purposes exhibit a calcium ion exchange rate of at least about 4 grains/gallon/minute/gram/gallon.

The amorphous aluminosilicate ion exchange materials usually have a $Mg^{++}$ exchange of at least about 50 mg eq. $CaCO_3$/g (12 mg $Mg^{++}$/g) and a $Mg^{++}$ exchange rate of at least about 1 grain/gallon/minute/gram/gallon. Amorphous materials do not exhibit an observable diffraction pattern when examined by Cu radiation (1.54 Angstrom Units).

Aluminosilicate ion exchange materials useful in the practice of this invention are commercially available. The aluminosilicates useful in this invention can be crystalline or amorphous in structure and can be naturally occurring aluminosilicates or synthetically derived. A method for producing aluminosilicate ion exchange materials is discussed in U.S. Pat. No. 3,985,669, Krummel et al., issued Oct. 12, 1976, incorporated herein by reference. Preferred synthetic crystalline aluminosilicate ion exchange materials useful herein are available under the designations Zeolite A, Zeolite B, and Zeolite X. In an especially preferred embodiment, the crystalline aluminosilicate ion exchange material has the formula $$Na_{12}[(AlO_2)_{12}(SiO2)12] \cdot xH_2O$$

wherein x is from about 20 to about 30, especially about 27 and has a particle size generally less than about 5 microns.

The granular detergents of the present invention can contain neutral or alkaline salts which have a pH in solution of seven or greater, and can be either organic or inorganic in nature. The builder salt assists in providing the desired density and bulk to the detergent granules herein. While some of the salts are inert, many of them also function as builders in the laundering solution.

Examples of neutral water-soluble salts include the alkali metal, ammonium or substituted ammonium chlorides, fluorides and sulfates. The alkali metal, and especially sodium, salts of the above are preferred. Sodium sulfate is typically used in detergent granules and is a particularly preferred salt. Citric acid and, in general, any other organic or inorganic acid may be incorporated into the granular detergents of the present invention as long as it is chemically compatible with the rest of the agglomerate composition.

Other useful water-soluble salts include the compounds commonly known as detergent builder materials. Builders are generally selected from the various water-soluble, alkali metal, ammonium or substituted ammonium phosphates, polyphosphates, phosphonates, polyphosphonates, carbonates, silicates, borates, and polyhydroxysulfonates. Preferred are the alkali metal, especially sodium, salts of the above.

Specific examples of inorganic phosphate builders are sodium and potassium tripolyphosphate, pyrophosphate, polymeric metaphosphate having a degree of polymerization of from about 6 to 21, and orthophosphate. Examples of polyphosphonate builders are the sodium and potassium salts of ethylene diphosphonic acid, the sodium and potassium salts of ethane 1-hydroxy-1,1-diphosphonic acid and the sodium and potassium salts of ethane, 1,1,2-triphosphonic acid. Other phosphorus builder compounds are disclosed in U.S. Pat. Nos. 3,159,581; 3,213,030; 3,422,021; 3,422,137; 3,400,176 and 3,400,148, incorporated herein by reference.

Examples of nonphosphorus, inorganic builders are sodium and potassium carbonate, bicarbonate, sesquicarbonate, tetraborate decahydrate, and silicate having a molar ratio of $SiO_2$ to alkali metal oxide of from about 0.5 to about 4.0, preferably from about 1.0 to about 2.4. The compositions made by the process of the present invention does not require excess carbonate for processing, and preferably does not contain over 2% finely divided calcium carbonate as disclosed in U.S. Pat. No. 4,196,093, Clarke et al., issued Apr. 1, 1980, and is preferably free of the latter.

As mentioned above powders normally used in detergents such as zeolite, carbonate, silica, silicate, citrate, phosphate, perborate, etc. and process acids such as starch, can be used in preferred embodiments of the present invention.

Powder stream

The powder stream into the high speed mixer comprises one or more of the builders and other powders described above.

Although the preferred embodiment of the process of the present invention involves introduction of all of the anionic surfactant via pastes as described above, it is possible to introduce some of the anionic surfactant via the powder stream, for example in the form of blown powder. In these embodiments, it is necessary that the stickiness and moisture of the powder stream be kept at low levels, thus preventing increased "loading" of the anionic surfactant and, thus, the production of agglomerates with too high of a concentration of surfactant. The liquid stream of a preferred agglomeration process can also be used to introduce other surfactants and/or polymers. This can be done by premixing the surfactant into one liquid stream or, alternatively by introducing various streams in the agglomerator. These two process embodiments may produce differences in the properties of the finished particles, particularly, if mixed surfactants are allowed to form prior to particle formation. These differences can then be exploited to the advantage of the intended application for each preferred process.

It has also been observed that by using the presently described technology, it has been possible to incorporate higher levels of certain chemicals (e.g. nonionic, citric acid) in the final formula than via any other known processing route without detrimental effects to some key properties of the matrix (caking, compression, etc.).

The Fine Dispersion Mixing and Granulation

The term "fine dispersion mixing and/or granulation," as used herein, means a continuous process of forming high active detergent granules by firstly, dispersing the detergent active paste rapidly throughout the powder stream. This processing step should take place in a high speed mixer in order to ensure that there is no local build-up of the paste that would cause balling or caking of the powder stream, and it should have a residence time of from 2 seconds to 30 seconds. Preferably, cutting tools are present in the high speed mixer which also ensure rapid dispersion and prevent balling or caking. It is preferred that the high speed mixer has a rotational speed of from 600 rpm to 2000 rpm.

Secondly, the dispersion formed by the powder stream and the detergent active paste passes to a moderate speed mixer/agglomerator where the size distribution, shape and porosity of the particles are defined. It is a feature of the present invention that this processing step has a short residence time, preferably less than 2 minutes, more preferably less than one minute, and most preferably less than 45 seconds. A longer residence time is undesirable because the porosity of the resulting particles is further reduced which has an increasingly negative effect on rate of dissolution.

In order to exercise control over the residence time in the moderate speed mixer/agglomerator, it is preferred that a mixer having a rotating shaft, lying along the mixer's axis is used. This shaft carries radially mounted blades which, when the shaft is rotated, mix the powders and transport them from the inlet port to the outlet port of the mixer. Two types of blade design are commonly used in such a mixer: one type of blade is known as the "ploughshare"; the other type is known as the "Becker" blade. A ploughshare is a two sided blade which promotes mixing by moving some powder forwards (axially towards the outlet port), and some powder backwards (axially towards the inlet port) at the same time. This causes excellent mixing, but tends to give a higher residence time. A "Becker" blade is a single sided blade which is oriented such that it mainly pushes powder forwards (axially towards the outlet port). This reduces the amount of mixing of the powders, but decreases the residence time through the mixer. The rotating shaft may carry a number of both types of blade. Choosing the ratio of the number of ploughshare blades to the number of "Becker" blades enables the residence time to be optimised.

The optimal ratio of numbers of different blades and their spacing around and along the shaft will depend on a number of factors including the size of the mixer/agglomerator, the required throughput, the speed of rotation etc.

It is preferred that the rotating shaft in the moderate speed mixer has a speed of from 60 to 150 rpm. Process conditions should be chosen to give a porosity of at least 10%, preferably at least 15% when measured by mercury porosimetry.

Optionally, the moderate speed mixer may have high speed cutting tools also present.

Optionally, a finely divided powder may be added to the moderate speed mixer in order to "dust" the particles. Preferably sodium aluminosilicate with an average particle size of less than 10 mm is used (such as those described hereinabove).

Thirdly, the resulting particles are dried and/or cooled.

Especially preferred are mixers of the Lödige® series. High speed mixers useful in the present invention include Lödige® CB machines; moderate speed mixers useful in the present invention include Lödige® KM machines.

Other suitable equipment can include the Drais® T160 series, manufactured by Drais Werke GmbH, Mannheim Germany and the Littleford Mixer with-internal chopping blades.

Any other mixer with fine dispersion mixing and granulation capability and having an appropriate residence time can be used. The "turbine-type" impeller mixer, having several blades on an axis of rotation, is preferred.

Operating Temperatures

Preferred operating temperatures should also be as low as possible since this leads to a higher surfactant concentration in the finished particle. Preferably the temperature during the agglomeration is less than 80° C., more preferably between 0° and 70° C., even more preferably between 10° and 60° C. and most preferably between 20° and 50° C. Lower operating temperatures useful in the process of the present invention may be achieved by a variety of methods known in the art such as nitrogen cooling, cool water jacketing of the equipment, addition of solid $CO_2$, and the like; with a preferred method being solid $CO_2$, and the most preferred method being nitrogen cooling.

A highly attractive option in a preferred embodiment of the present invention to further increase the concentration of surfactant in the final particle, is accomplished by the addition to a liquid stream containing the anionic surfactant and/or other surfactant, of other elements that result in increases in viscosity and/or melting point and/or decrease the stickiness of the paste. In a preferred embodiment of the process of the present invention the addition of these elements can be done in line as the paste is pumped into the agglomerator.

Final Base Powder Composition

The present invention produces granules of high density for use in detergent compositions. A preferred composition of the final agglomerate for incorporation into granular detergents has a high surfactant concentration. By increasing the concentration of surfactant, the particles/agglomerates made by the present invention are more suitable for a variety of different formulations. These high surfactants containing particle agglomerates require fewer finishing techniques to reach the final agglomerates, thus freeing up large amounts of processing aids (inorganic powders, etc.) that can be used in other processing steps of the overall detergent manufacturing process (spray drying, dusting off, etc).

The granules made according to the present invention are large, low dust and free flowing, and preferably have a bulk density of from about 650 to about 1000 g/l, more preferably from about 700 to about 900 g/l.

A finished detergent composition can be made by mixing the granulated agglomerates of the present invention with other ingredients useful in the laundry process including builders, polymers and optional ingredients described herein. However, in order not to lose the benefits of the invention, it is preferred that at least 80% by weight of the total amount of anionic surfactants in the final composition are incorporated within the agglomerates of the invention, most preferably in the surfactant paste. If a spray dried powder is incorporated into the finished composition, then preferably it should contain less than 5% by weight of anionic surfactant.

Drying

The desired moisture content of the free flowing granules of this invention can be adjusted to levels adequate for the intended application by drying in conventional powder drying equipment such as fluid bed dryers. If a hot air fluid bed dryer is used, care must be exercised to avoid degradation of heat sensitive components of the granules. It is also advantageous to have a cooling step prior to large scale storage. This step can also be done in a conventional fluid bed operated with cool air. The drying/cooling of the agglomerates can also be done in any other equipment suitable for powder drying such as rotary dryers, etc.

For detergent applications, the final moisture of the agglomerates needs to be maintained below levels at which the agglomerates can be stored and transported in bulk. The exact moisture level depends on the composition of the agglomerate but is typically achieved at levels of 1–8% free water (i.e. water not associated to any crystalline species in the agglomerate) and most typically at 1–4%.

In order to achieve the benefits of good dispensing which are one of the objectives of this invention it is preferred that the weight fraction of the surfactant containing granulated agglomerates which passes through a Tyler sieve mesh 60 (250 microns), should be less than 20%. It is a feature of this invention that this can be achieved without compromising the rate of dissolution of the granulated agglomerates.

Polymers

Also useful are various organic polymers, some of which also may function as builders to improve detergency. Included among such polymers may be mentioned sodium carboxy-lower alkyl celluloses, sodium lower alkyl celluloses and sodium hydroxy-lower alkyl celluloses, such as sodium carboxymethyl cellulose, sodium methyl cellulose and sodium hydroxypropyl cellulose, polyvinyl alcohols (which often also include some polyvinyl acetate), polyacrylamides, polyacrylates and various copolymers, such as those of maleic and acrylic acids. Molecular weights for such polymers vary widely but most are within the range of 2,000 to 100,000.

Polymeric polycarboxylate builders are set forth in U.S. Pat. No. 3,308,067, Diehl, issued Mar. 7, 1967. Such materials include the water-soluble salts of homo-and copolymers of aliphatic carboxylic acids such as maleic acid, itaconic acid, mesaconic acid, fumaric acid, aconitic acid, citraconic acid and methylenemalonic acid.

Optionals

Other ingredients commonly used in detergent compositions can be included in the compositions of the present invention. These include flow aids, color speckles, bleaching agents and bleach activators, suds boosters or suds suppressors, antitarnish and anticorrosion agents, soil suspending agents, soil release agents, dyes, fillers, optical brighteners, germicides, pH adjusting agents, nonbuilder alkalinity sources, hydrotropes, enzymes, enzyme-stabilizing agents., chelating agents and perfumes.

Optical brighteners may be incorporated either directly in the agglomerates herein by way of the powder stream into the agglomerating unit.

Particulate suds suppressors may also be incorporated either directly in the agglomerates herein by way of the powder stream into the agglomerating unit, or in the finished composition by dry adding. Preferably the suds suppressing activity of these particles is based on fatty acids or silicones.

Test Method

Rate of Dissolution of Anionic Surfactants under Stressed Conditions

Sotax Double Propeller Method

Equipment

1) Sotax cup (1 L)
2) Distilled water
3) Electrical stirrer motor with variable speed (IKA-Werk RW 20 DZM)
4) Stainless steel propeller stirrer (Sotax no 3990-2)
5) Second marine propeller just beneath the water surface (type A 100, diameter 51 mm)
6) 6 disposable filter type units with pore size 0.22 micron (25 mm diam., Millex No. SLGSO25NB Millipore).
7) Plastic syringes (2 mL) and disposable needles (21×1½)
8) Sample collectors (15 mL glass tubes)
9) Set of Tyler sieves and sieving equipment (Rotap)
10) Thermosrated bath Sample Preparation Sieve 150 g of a representative sample of the agglomerates to be tested (do not sieve finished products). Collect the desired particle size fraction, between Tyler 20 (750 microns) and Tyler 35 (425 microns).

Experimental Procedure

1) Place the cup containing 1 L of water (or desired solution) in the bath at 20° C.
2) Place the impeller in the beaker at 0.33 cm from the bottom and the second propeller just beneath the water surface.
3) Prepare 5 syringes with a filter unit and a needle. Prepare 1 syringe with needle without the filter.
4) Set the mixer speed to 100 r.p.m.
5) Quickly add 10 g of the product to be tested. Start the stopwatch.
6) Remove at precise intervals of time about 2 mL samples with the syringes (sample after 10 sec., 30 sec., 1 min., 2.5 min. and 5 min.). For adequate sampling, the needle has to be about 4 cm below the surface of the liquid.
7) After taking the 5 min. sample, increase the speed of the impeller to 300 r.p.m.
8) After a further 10 minutes, take another sample through the filter.
9) Take a sample of the liquid with the syringe without filter. The difference between the result of this and the previous one is an indication of the solubility that can be expected at this temperature. Care must be taken that during this time, the system does not increase its temperature due to the vigorous stirring action.
10) Analyse the samples for cationic sulphate (catSO3). When using a turbidimetric end point indication for the titration, care must be taken that there is no interference in the unfiltered sample due to the presence of insolubles.

11) Calculate the percent dissolved in each sample by using the unfiltered sample as 100% (by CatSO3 analysis, even the undissolved surfactant will be titrated).

12) Plot the percent dissolved versus time for the first period of time (up to 5 min.). Calculate the percent solubility at the experimental conditions from the filtered sample at 10 min.

The invention will be further described with the help of the following non-limiting examples.

EXAMPLE 1

An aqueous surfactant paste containing the sodium salts of the anionic surfactants linear alkyl benzene sulphonate (LAS), tallow alkyl sulphate (TAS) and alkyl ether sulphate with an average of 3 ethoxy groups per molecule (AE3S) was prepared at a ratio of 74:24:2. The paste had a total surfactant activity of 80%, a water content of 17% and a viscosity of 25000 mPas when measured at a shear rate of 25 $sec^{-1}$ and a temperature of 70° C. A powder stream containing a mixture of zeolite A, sodium carbonate, and carboxymethylcellulose (CMC) at a ratio of 60:36:4 was continuously mixed.

The paste was pumped by a positive displacement pump into a Loedige® CB55 high shear mixer at a rate of 2.8 tonnes/hour, and, simultaneously, the powder stream was fed into the mixer at a rate of 4.0 tonnes/hour.

Also flowing into the mixer were two streams containing the recycle of the classification of the agglomerates, one containing wet, coarse products and the other one dry, fine particles. A third stream containing the dust collected from the fluid bed dryer was also fed into the mixer at a very low rate (<100 kg/hour).

The Loedige® CB55 mixer was operated at 1460 rpm and an average residence time of 10–15 seconds. The product leaving the high speed mixer consists of a dispersion of anionic surfactant paste and powders, substantially in the form of a fine dust.

This product was then transferred by bucket elevator into a Loedige® KM3000 moderate speed mixer. The shaft carrying the ploughshares of the moderate speed mixer was operated at 110 rpm. Additionally, four high speed choppers were installed on shafts radially mounted in the side wall of the mixer and operated at 3000 rpm. After about ¾ of the horizontal length of the mixer, a stream of zeolite A was added at a rate of 0.55 tonnes/hour. The residence time in the moderate speed mixer may be controlled by means of an outlet gate. Closing this gate causes the weight of product which is held within the mixer to increase, which in turn increases the residence time. In the first example, the outlet gate was fully open causing about 170 kg of product to be retained in the mixer and giving a residence time of below 1 minute.

The product leaving the Loedige® KM3000 moderate speed mixer consisted of well defined agglomerated granules. These wet agglomerates were classified in a vibrating sieve to separate the coarse fraction and return it to the high shear mixer by means of a vibrating chute. The remaining agglomerates were dried and cooled in a fluid bed drier followed by a fluid bed cooler. The product leaving the cooler was sieved to remove the fines which were then also recycled back to the high shear mixer. The residence time in the fluid beds was about 15–20 minutes in total and the equilibrium relative humidity of the product was between 12 and 18%.

The final agglomerated granules made in this example had an activity of 33.8%, and a bulk density of 760 g/l The agglomerated granules had a mean particle size was 540 µm, the fraction not passing through a Tyler sieve mesh 14 (coarser than 1180 µm) was 10%, and the fraction passing through a Tyler sieve mesh 60 (finer than 250 µm) was 7%.

The rate of dissolution of the agglomerates was tested in a Sotax bath at 20° C. (see test method above). The results obtained were:

| Time (secs) | % dissolved |
| --- | --- |
| 10 | 15.0 |
| 30 | 26.3 |
| 60 | 50.0 |
| 150 | 65.0 |
| 300 | 96.0 |

These agglomerates were then used as components of a finished detergent composition by dry mixing with a blown powder containing polymer, zeolite and minors, and further mixing with granular silicate, granular carbonate,. granular perborate and agglomerates comprising bleach activator. The final formulation tested is given hereinbelow.

The finished product was tested for its dispensing properties out of the drawer of a standard washing machine of the shower type. A Zanussi® washing machine was used. The water flow rate through the dispensing drawer was limited to 2 l/min and the water temperature was 20° C. The amount of finished product still left in the drawer after two minutes of water flow (the residue) over 150 g of the finished product was weighed and expressed as a percentage of the initial 150 g.

The finished product of this example had a density of 700 g/l and an average of 10 repetitions of the dispensing test gave an average residue of 14%.

EXAMPLE 2

Granular agglomerates were prepared by the processing steps of high speed mixer, moderate speed mixer, drying and cooling in a similar manner to that described in example 1. In this example the surfactant paste was added at a rate of 2.55 tonnes/hour, and the powder stream added at a rate of 3.2 tonnes/hour to the high speed mixer. The zeolite addition to the moderate speed mixer was 0.25 tonnes/hour.

In this example the outlet gate of the Loedige® KM3000 moderate speed mixer was only two thirds open, causing about 240 kg of product to be retained in the mixer and giving a residence time of about 1.5 minutes.

The agglomerates made in this example had an average activity of 32%, and a bulk density of 780 g/l. The agglomerated granules had a mean particle size was 530 µm, the fraction not passing through a Tyler sieve mesh 14 (coarser than 1180 µm) was 8%, and the fraction passing through a Tyler sieve mesh 60 (finer than 250 µm) was 6%.

The rate of dissolution of these agglomerates, measured by the same method as described in example 1 was:

| Time(secs) | % dissolved |
| --- | --- |
| 10 | 10.8 |
| 30 | 23 |
| 60 | 40 |
| 150 | 64.3 |
| 300 | 92 |

The same finished composition as in example 1 (given below) was then made by dry adding further ingredients as described in example 1.

The dispensing test resulted in an average dispensing residue of 15%.

Comparative Example 3

Granular agglomerates were prepared by the processing steps of high speed mixer, moderate speed mixer, drying and cooling in a similar manner to that described in example 1. In this example the surfactant paste was added at a rate of 2.2 tonnes/hour, and the powder stream added at a rate of 3.2 tonnes/hour to the high speed mixer. The zeolite addition to the moderate speed mixer was 0.25 tonnes/hour.

In this example the outlet gate of the Loedige® KM3000 moderate speed mixer was only one half open, causing about 520 kg of product to be retained in the mixer and giving a residence time of over 3 minutes.

The agglomerates made in this example had an average activity of 29%, and a bulk density of 860 g/l. The agglomerated granules had a mean particle size was 523 µm, the fraction not passing through a Tyler sieve mesh 14 (coarser than 1180 µm) was 10%, and the fraction passing through a Tyler sieve mesh 60 (finer than 250 µm) was 12.5%.

The rate of dissolution of these agglomerates, measured by the same method as described in example 1 was:

| Time(secs) | % dissolved |
| --- | --- |
| 10 | 12.2 |
| 30 | 14.9 |
| 60 | 26.9 |
| 150 | 58.9 |
| 300 | 83.9 |

The same finished composition as example 1 (given below) was then made by dry adding further ingredients as described in example 1. The dispensing test resulted in an average dispensing residue of 12%.

Comparative Example 4

A finished product was also made incorporating agglomerated granules made by a different process. In this example the agglomerated granules contained no anionic surfactant as a liquid binder in the high shear mixer. Instead the anionic surfactant was incorporated in a spray dried powder which was added to the powder stream introduced into the high shear mixer. Although these agglomerated granules showed a good rate of dissolution (70% after 60 seconds, 98% after 300 seconds), finished products made using these agglomerates had very poor dispensing properties when tested using the stressed test described above. The average residue was 90%.

Summary of Rates of Dissolution of Granular Agglomerates in Examples 1–4

| Example | 1 | 2 | 3 | 4 |
| --- | --- | --- | --- | --- |
| Surfactant Activity | 33.8% | 32% | 29% | 30% |
| % dissolved after 60 secs (Sotax test) | 50% | 40% | 27% | 70% |
| % dissolved after 300 secs(Sotax test) | 96% | 92% | 84% | 98% |

Summary of Finished Product Composition Properties from Examples 1–4
Finished Product Composition:

| | |
| --- | --- |
| Linear alkyl benzene sulphonate | 7.5% |
| alkyl sulphate/alkyl ether sulphate | 2.5% |
| nonionic surfactant | 4% |
| zeolite A | 20% |
| carbonate | 14% |
| silicate | 4% |
| organic builder | 7% |
| perborate bleach and activator | 25% |
| polymers | 5% |
| minors (perfume, suds suppressing agents, brightener etc.) | 5% |
| moisture | 6% |
| bulk density = 700 g/l | |

| Example | 1 | 2 | 3 | 4 |
| --- | --- | --- | --- | --- |
| Dispensing residue | 14% | 15% | 12% | 90% |

Furthermore, the effect of the rate of dissolution of the agglomerates made in these examples can be assessed by comparing greasy stain removal of the finished compositions. In each case standard stain tracers were added to a laundry load which was washed in a Hotpoint® machine 40° C. cycle using city water and 105 g of product. (NB. The product was added directly into the machine so that different dispensing properties did not influence these results). The tracers were then graded for comparison (giving example 1 an index value of 100, index values lower than 100 indicating poorer greasy stain removal).

| Example | 1 | 2 | 3 | 4 |
| --- | --- | --- | --- | --- |
| Greasy Stain Removal Index Value | 100 | 90 | 78 | 100 |

What is claimed is:

1. A continuous process for making detergent granules having a bulk density greater than about 650 g/l, which process comprises the steps of:
    (a) mixing a surfactant paste comprising at least 10% by weight of a neutralized anionic surfactant and a powder which is water soluble and is selected from the group consisting of alkali metal salts of phosphates, polyphosphates, phosphonates, polyhhosphonates, carbonates, silicates, borate, polyhdroxysulfonates and mixtures thereof, using a mixer at a first speed for a period of from 2 seconds to 30 seconds, wherein the first speed is from 600 to 2000 RPM and is sufficient to substantially eliminate localized build-up, balling or caking of the powder,
    (b) agglomerating the resulting mixture using a mixer of a second speed of from 60 go 150 RPM for a period of less than one minute; and
    (c) subjecting the detergent granules to at least one of drying and cooling;
wherein the second speed is sufficient to provide the final detergent granules with a porosity of not less than 15%.

2. The process according to claim 1, wherein step (b) additionally comprises adding to the mixture a finely divided powder having an average particle size of less than 10 microns.

3. The process according to claim 2, wherein the finely divided powder comprises sodium aluminosilicate.

4. The process according to claim 1, wherein the surfactant paste comprises from 40% to 95% by weight of a neutralized anionic surfactant.

5. The process according to claim 1, wherein the period for agglomerating at the second speed is less than 45 seconds.

6. The process according to claim 1, wherein the viscosity of the surfactant paste is from 20,000 cps to 100,000 cps.

7. The process according to claim 1, wherein less than 20% by weight of the detergent granules can pass through a sieve of Tyler mesh 60.

8. The process according to claim 1, wherein the surfactant paste of step (a) is introduced into the mixer at a temperature of greater than about 40° C.

9. The process according to claim 1, wherein at least one of the mixers has one of an axial rotating shaft carrying radially mounted blades and internal chopping blades.

10. The process according to claim 1, wherein at least one of the mixers has a ploughshare blade.

11. The process according to claim 1, wherein at least one of the mixers has a single sided blade oriented such that it moves the material being mixed substantially axially.

* * * * *